United States Patent
Meron et al.

(10) Patent No.: US 11,443,224 B2
(45) Date of Patent: *Sep. 13, 2022

(54) AUTOMATED MACHINE LEARNING FEATURE PROCESSING

(71) Applicant: PAYPAL, INC., San Jose, CA (US)

(72) Inventors: Avishay Meron, Gush-Dan (IL); Venkatesh Ramanathan, San Jose, CA (US); Roy Valler, Tel-Aviv (IL)

(73) Assignee: PayPal, Inc., San Jose, CA (US)

( * ) Notice: Subject to any disclaimer, the term of this patent is extended or adjusted under 35 U.S.C. 154(b) by 1573 days.

This patent is subject to a terminal disclaimer.

(21) Appl. No.: 15/249,790

(22) Filed: Aug. 29, 2016

(65) Prior Publication Data

US 2018/0046939 A1    Feb. 15, 2018

Related U.S. Application Data (60) Provisional application No. 62/373,101, filed on Aug. 10, 2016.

(51) Int. Cl.
*G06N 5/00*     (2006.01)
*G06N 20/00*    (2019.01)
(Continued)

(52) U.S. Cl.
CPC .............. *G06N 20/00* (2019.01); *G06F 21/00* (2013.01); *G06F 21/554* (2013.01); *G06N 5/003* (2013.01); *G06Q 20/405* (2013.01)

(58) Field of Classification Search
CPC ....... G06N 5/00–048; G06N 7/00–026; G06N 20/00; G06Q 20/401; G06Q 20/4016
(Continued)

(56) References Cited

U.S. PATENT DOCUMENTS

2005/0144147 A1*  6/2005  Lee ................. G06K 9/6282
                                                    706/12
2015/0264063 A1*  9/2015  Jenson ............. G06Q 20/384
                                                    726/22
(Continued)

OTHER PUBLICATIONS

Zeng et al. "A novel feature selection method considering feature interaction", 2015, Pattern Recognition 48, pp. 2656-2666.*
(Continued)

*Primary Examiner* — Jue Louie
(74) *Attorney, Agent, or Firm* — Haynes and Boone, LLP (57) ABSTRACT

Systems and methods for machine learning feature processing are disclosed. An example method includes: selecting a predefined number of machine-based transactions; identifying a first set of features based on the predefined number of machine-based transactions; and applying a machine learning feature selection algorithm to identify a second set of features. The second set of features is smaller than the first set of features, and the second set of features includes no more than a predefined number of features. The method also includes constructing a decision tree based on the second set of features, wherein the decision tree has a depth that is less than a predefined depth. The method optionally includes limiting the total number of features in the second set to no greater than the predefined number of features.

20 Claims, 6 Drawing Sheets

(51) Int. Cl.
  *G06F 21/55* (2013.01)
  *G06F 21/00* (2013.01)
  *G06Q 20/40* (2012.01)

(58) Field of Classification Search
  USPC .............. 706/12, 15, 16, 20, 45–47, 59–61; 705/75
  See application file for complete search history.

(56) References Cited

U.S. PATENT DOCUMENTS

| | | | | |
|---|---|---|---|---|
| 2015/0379166 | A1* | 12/2015 | Xin | G06K 9/00536 703/2 |
| 2016/0127319 | A1* | 5/2016 | Xiong | G06N 5/025 726/1 |
| 2017/0200164 | A1* | 7/2017 | Choi | G06N 20/00 |

OTHER PUBLICATIONS

Bins et al. "Feature Selection from Huge Feature Sets", 2001, Proceedings Eighth IEEE International Conference on Computer Vision.*

Wang et al. "A Comparative Study of Threshold-based Feature Selection Techniques", 2010, Proceedings of 2010 IEEE International Conference on Granular Computing.*

J. R. Quinlan "Simplifying decision trees", 1999, Int. J. Human-Computer Studies.*

Patil et al. "Evaluation of Decision Tree Pruning Algorithms for Complexity and Classification Accuracy", 2010, International JOurnal of Computer Applications.*

Sahin et al. "A cost-sensitive decision tree approach for fraud detection", 2013, Expert Systems with Applications.*

* cited by examiner

Available features 204
- Current device location = China
- User account registration country = US
- Transaction amount = $1,200
- Device IP = 202.125, 004. 65
- Most frequent login location = US
- Recent user activity level = <5 in last six months
- Item purchased = smartphone
- Average amount = $100

Selected features 206
- Item purchased = smartphone
- Recent user activity level = <5 in last six months
- Average amount = $100

Decision tree 208

Transaction categorization rule 208

If "*less than 5 user activities in last six month*" and "*average amount is no greater than $100 per transaction*" and current transaction includes "*buying a smartphone*"

then the current transaction is highly likely to be a fraudulent transaction.

AUTOMATED MACHINE LEARNING FEATURE PROCESSING

RELATED APPLICATION

This application claims priority to the U.S. Provisional Patent Application Ser. No. 62/373,101, filed on Aug. 10, 2016, entitled "automated machine learning feature processing," which is hereby incorporated by reference in its entirety.

TECHNICAL FIELD

The present disclosure relates generally to machine learning, and in particular, to automated machine learning feature processing and transaction classification based thereon.

BACKGROUND

Machine learning algorithms can be applied to identify computerized transactions of a certain nature, for example, to spot transactions from a user account that has been taken over by a hacker or transactions from a legitimate account but with fraudulently obtained payment information. For example, a machine learning algorithm may first identify a number of features descriptive of "bad" (e.g., unauthorized) transactions and then use these features to identify future "bad" transactions.

The number of features identified, however, can be quite large (e.g., hundreds or thousands). Using a large number of features to identify future "bad" transaction, by a computer automatically or by a user manually, can be time- and resource-consuming and therefore might not be suitable for situations where a determination (as to whether a transaction is an authorized transaction or an unauthorized transaction) needs to be made on a real time basis, e.g., as the transaction is taking place or shortly thereafter (e.g., 1 minute).

There is therefore a need for a device, system, and method, which select machine learning features and generate rules that can be used to identify certain transactions within a predefined time frame.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods constructing machine learning rules based on a refined number of features and applying the rules to categorize (or classify) future transactions on a real time basis.

In some implementations, past transaction data (e.g., transaction properties) may be used to identify an initial set of machine learning features. The initial set of machine learning features may include hundreds or even thousands of features and may need to be narrowed down using one or more machine learning algorithms to a smaller set of features, e.g., a total of five to ten features that may be more representative of the selected past transactions. The smaller set of features may then be used to construct a decision tree, on which each node represents one or more transaction properties. A test data set may be applied to the decision tree to determine which one or more tree paths produce more accurate (e.g., reliable) results. Tree paths (or the nodes included therein) that can produce results above a predefined accuracy (e.g., 90%) are selected to construct additional machine learning rules. The additional rules can be used to categorize a transaction within a reduced response time (e.g., 1 minute).

An example process may include one or more of the following steps:
- a transaction occurs;
- the transaction matures into (e.g., is determined to be) a fraud/benign transaction and is then included in a past transaction data set (that can be used to identify an initial set of features);
- a machine learning system randomly samples matured (e.g., past) transactions, from the past transaction data set, and their associated features (e.g., the IP address of the user device initiating a transaction, the geo-location of the user device, a transaction amount, and the type of a currency used);
- the machine learning system selects a subset of features from the sampled features using one or more machine learning algorithms (e.g., a Markov blanket algorithm);
- the machine learning system learns a decision tree based on the subset of features;
- the machine learning system evaluates the subset of features based on a test data set; and
- the machine learning system generates machine learning rules based on the evaluation and adds the rules to a rule engine.

The systems and methods described in the present disclosure can provide a variety of technical advantages.

First, using a small set of features can reduce the complexity (e.g., the depth) of the corresponding decision tree and therefore produce a smaller number of, but more effective, fraud detection rules. This is technically advantageous for the purpose of fraud detection and prevention. Fraudulent transactions often occur in a great number over a short period of time. Once a transaction is preliminarily identified as a fraudulent transaction, a manual verification and fraud pattern detection process may be needed. This can cause a significant delay between identifying a fraudulent activity and taking counter-measures to prevent imminent fraud transactions. Using a small number of rules to detect fraudulent transactions can reduce reaction latency and mitigate loss.

Second, machine learning rules can be constructed to specifically identify benign transactions, reducing the burden for assessing the risk of these transactions using additional computing resources.

Third, using a small set of feature can produce more user-friendly rule descriptions, e.g., descriptions that are more informative and easily understood by a human user. For example, a human user may be asked to determine whether a given transaction should be authorized based on a set of rules. Rules that are more easily comprehended by a user may lead to more accurate user actions.

Additional details of implementations are now described in relation to the Figures.

Figure 1:
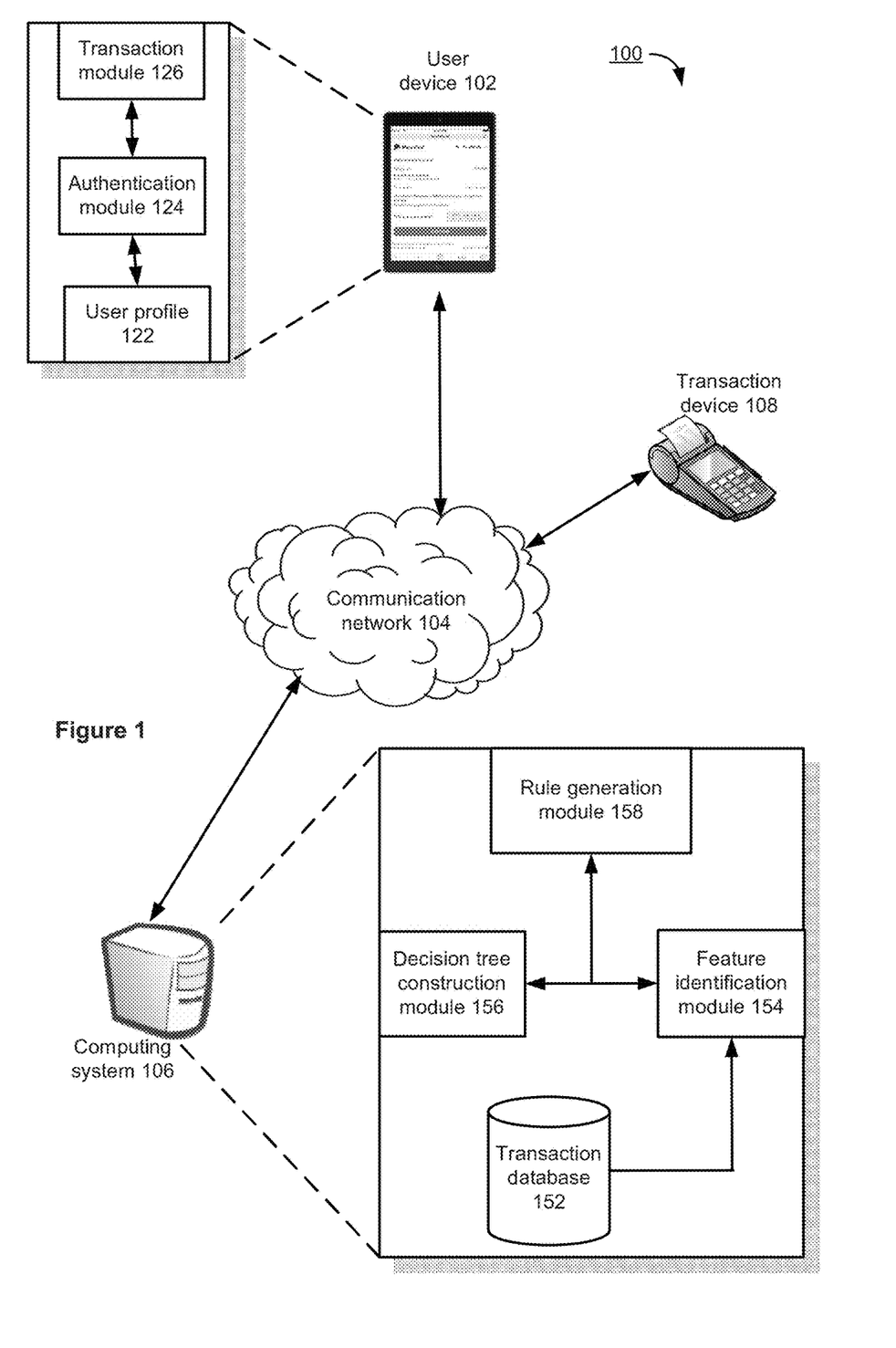
FIG. 1 is a schematic view illustrating an embodiment of a system for selecting machine learning features and constructing rules based on the selected features.

FIG. 1 is a schematic view illustrating an embodiment of a system 100 for selecting machine learning features and constructing rules based on the selected features. The system 100 may comprise or implement a plurality of servers and/or software components that operate to perform various technologies provided in the present disclosure.

As illustrated in FIG. 1, the system 100 may include a user device 102, a transaction device 108, and a computing system 106 in communication over a communication network 104. In the present disclosure, a user device may be a mobile payment device, a smartphone, a laptop computer, a notebook computer, a mobile computer, a wearable computing device, or a desktop computer.

In one embodiment, the user device 102 collects authentication information from a user and determines, based on the authentication information, whether to successfully authenticate the user on the user device 102 or in one or more software applications (or apps) installed thereon (e.g. a payment app, a ride-sharing app, and an online purchase app). The authentication information may include login credentials (e.g., a user name, a password, and a personal identification number (PIN)). Once a user is successfully authenticated, the user device 102 enables the user to conduct one or more transactions (e.g., making a payment for purchasing an item and receiving a payment for selling an item) using the user device 102.

In one embodiment, the user device 102 may store a user profile 122 and include an authentication module 124 and a transaction module 126. The user profile 122 may include information identifying a user whose account is active (e.g., whose account has been logged in) on the user device 102 or in a software application (or app) install on the user device 102.

The user profile 122 may include information identifying a user, for example, user account information (e.g., an account number, a user name and the corresponding password, and a PIN), a frequent login location for identifying a location at which a frequently logs in a user account (e.g., 10 times within 72 hours from Foster City, the State of California, USA); and an account registration location 422 for identifying a location at which a user account was initially registered or enrolled (e.g., the city of Shanghai, China). The user profile 122 may additionally include a user's full legal name, home address, billing address, preferred shipping address, and date of birth.

The authentication module 124 may authenticate a user on the user device 102 as well as in one or more software applications (or apps) installed on the user device 102 using one or more authentication means. In one embodiment, the authentication module 124 may authenticate a user based on a user name and the corresponding password. In another embodiment, the authentication module 124 may authenticate a user (e.g., in a payment app) using Fast IDentify Online (FIDO) technologies. The password-less FIDO technology is supported by the Universal Authentication Framework (UAF) protocol. In some embodiments, a user registers her device to the online service by selecting a local authentication mechanism such as swiping or scanning a finger, looking at the camera, speaking into the microphone, entering a PIN, etc. The UAF protocol allows the online service to select which mechanisms are presented to the user.

The transaction module 126 may effectuate a transaction involving the user device 102, the transaction device 108, the computing system 106, or a combination thereof. For example, the transaction module 126 may enable a user to (1) make a payment for an item she purchased using the user device 102, (2) receive a payment for an item she sold or requested refund for using the user device 102; and/or (3) transfer funds with a different user using the user device 102.

In one embodiment, the communication network 104 interconnects a user device 102, a transaction device 108, and the computing system 106. In some implementations, the communication network 104 optionally includes the Internet, one or more local area networks (LANs), one or more wide area networks (WANs), other types of networks, or a combination of such networks.

In one embodiment, the transaction device 108 (which may also be referred to as a merchant device) includes a device associated with a merchant for processing a transaction with the user device 102. The transaction device 108, for example, may be a Point-Of-Sale (POS) machine.

In one embodiment, the server system 106 generates one or more transaction categorization rules and categorizes (e.g., classifies) a future, pending, or past transaction based on the one or more transaction categorization rules on a substantially real time basis (e.g., while the transaction is still taking place or within a predefined time frame after the transaction has completed, e.g., 30 seconds or 1 minute).

In one embodiment, the server system 106 includes a transaction data base 152, a feature identification module 154, a decision tree construction module 156, and a rule generation module 158.

In one embodiment, the transaction database 152 stores data identifying one or more transactions. Each transaction may undergo a decision phase. Example decisions may include "approve", "deny", and "further processing through an authentication work flow." Fraudulent transactions, e.g., purchase transactions conducted with stolen credit cards, may result in loss to a merchant or a seller, e.g., due to charge-back claims. The time period between approving a transaction and knowing its nature (e.g., fraudulent or benign) may be referred to as the transaction maturation. For example, account takeover or ATO transaction maturation may be about two months, with about 20% of the ATO transactions identified within a week. A mature transaction is a labeled (e.g., as a fraud/benign transaction) and comprises a tagged data set for the machine learning purpose.

Data relating to the mature transactions are stored in the transaction database 152, from which a predefined number of machine-based transactions selected at step 302 can be randomly selected. The transaction database 152 may store the following example transaction data: a transaction amount (e.g., $254.89), one or more items (e.g., goods or services) purchased (e.g., a smartphone, a tablet computer, and an air ticket), and one or more transaction locations (e.g., the location of a user device involved in the transaction and the location of a transaction device involved in the transaction).

In one embodiment, the feature identification module 154 identifies an initial set of features based on past transaction data and then selects, based on one or more machine learning algorithms, a subset of these features. The initial set of features is sometimes referred to as the base features and the subset of features are sometimes referred to as the refined features (or "best" features).

In some embodiments, the selected past transaction data (sometimes referred to as the initial training data set) are descriptive of past transactions of the same nature as are transactions for which categorizations rules are to be generated.

For example, if the computing system 106 is to generate rules for identifying future fraudulent transactions, data descriptive of past fraudulent transactions are selected for inclusion into the initial training data set; if the computing system 106 is to generate rules for identifying future high-risk transactions, data descriptive of past high-risk transactions are selected for inclusion into the initial training data set; and if the computing system 106 is to generate rules for identifying transactions arising from an Account-Take-Over (ATO), data descriptive of past transactions arising from an ATO are selected for inclusion into the initial training data set.

For another example, to generate rules for identifying transactions involving a stolen credit card, the feature identification module 154 may randomly select, from the transaction database 152, 1,000 past transactions that involve the use of a stolen credit card. The feature identification module 154 may then identify a set of transaction variables or other properties (e.g., a transaction amount, a transaction location, a payment method, an account registration location, a recent user activity level, and one or more items purchased) for each transaction in the selected 1,000 transactions. This set of transaction properties are sometimes referred to as the initial set of features.

The initial set of features may include a large number of features (e.g., 3,000 features), and, as a result, the feature identification module 154 may apply one or more machine learning algorithms to the initial set of features to identify a subset of features (or a set of "best" features) that has a much smaller number of features (e.g., six to twelve features). To this end, the feature identification module 154 may apply multiple different machine learning algorithms or modify the input (e.g., the initial set of features) to the one or more machine learning algorithms.

In one embodiment, the decision tree construction module 156 constructs a decision tree based on the subset of features selected by the feature identification module 154 and determines the accuracy level of each node on the decision tree based on a test data set. For example, the decision tree construction module 156 may designate each selected (or "best") feature as a node in the decision tree and connect two nodes with an edge when a feature is present in a transaction (or when a condition represented by a feature is met in a transaction). For example, if a transaction involves a payment for a smartphone that is greater than $500, the decision tree construction module 156 may connect the node A ("an item purchased is a smart phone") and the node B ("the payment is more than $100") with an edge.

After constructing a decision tree, the decision tree construction module 156 may evaluate the accuracy of the decision tree (or nodes included therein) with a test data set. The test data set may include data relating to transactions of a particular nature, e.g., known fraudulent transactions where a stolen user identity is used to apply for a purchase credit line. The test data set may be smaller than the past transaction data set used to select the "best" features. After applying the test data set to a decision tree, based on comparing the prediction results produced by the decision tree and the known nature of the transactions, the decision tree construction module 156 may determine an accuracy level for each node in the decision tree.

In one embodiment, the rule generation module 158 generates one or more transaction categorization rules based on nodes having an accuracy level equal to or greater than a predefined accuracy level (e.g., 95%).

For example, if, for the purpose of estimating whether a transaction involves a fraudulent use of a credit card, the node A ("an item purchased is a smart phone") has an accuracy level of 98%, and the node B ("the purchase location is more than 500 miles from the account registration location") has an accuracy level of 99%, a rule specifying that a purchase of a smartphone taking placing at a location more than 500 miles from the account registration location can be generated and added to a rule engine.

Figure 2A:
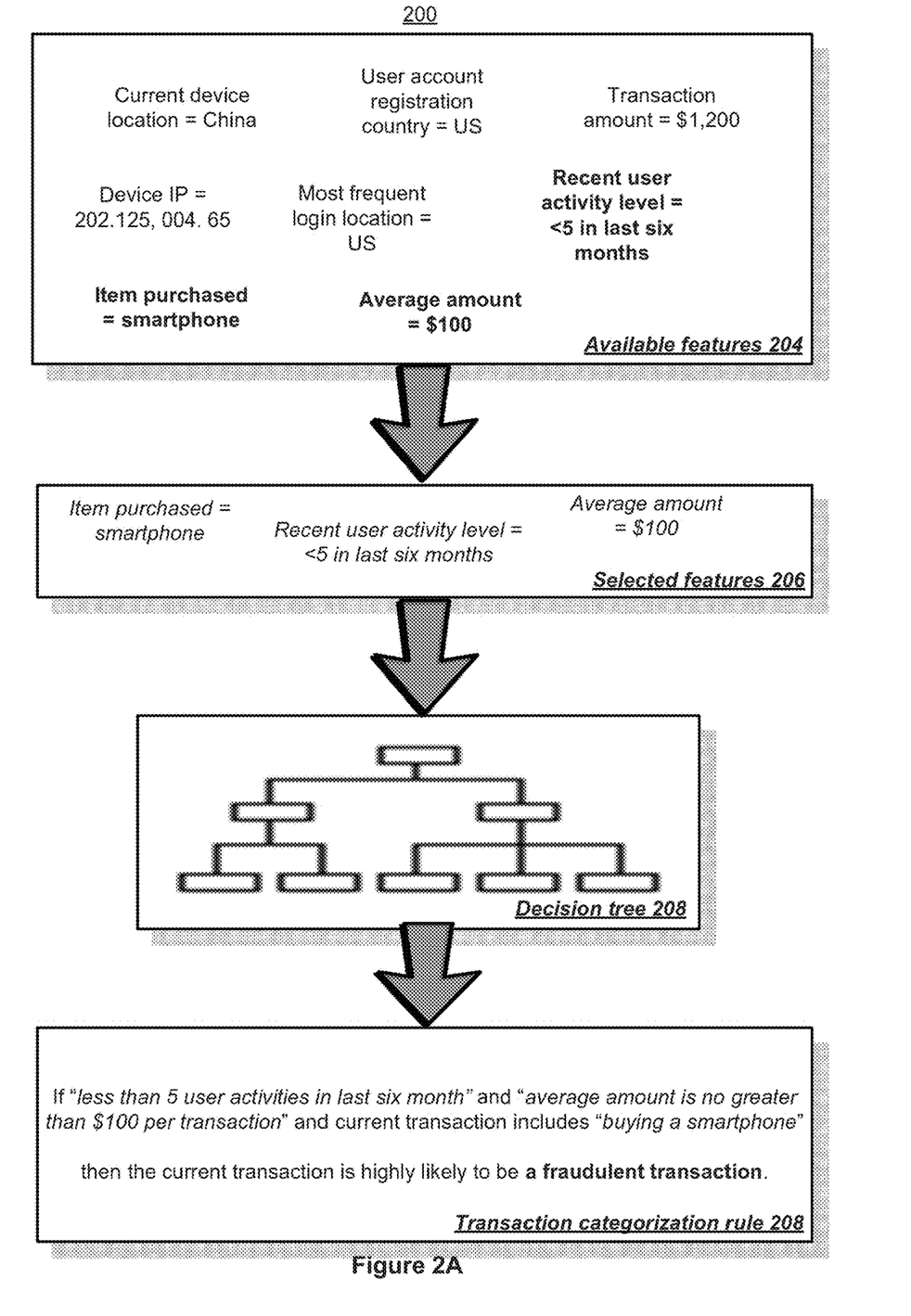
FIG. 2A is a schematic view illustrating an embodiment of a process for selecting machine learning features and constructing rules based on the selected features.

FIG. 2A is a schematic view illustrating an embodiment of a method 200 for selecting machine learning features and constructing rules based on the selected features. The computing device 106, for example, when programmed in accordance with the technologies described in the present disclosure, can perform the method 200.

The method 200 may begin with selecting data relating to one or more past transactions from a database, e.g., the transaction database 152. In some implementations, the one or more past transactions include transaction of a particular nature, e.g., purchase transactions conducted with a stolen user identity, refund transactions involving money laundering activities, and commercial funds transfers (e.g., where transaction fees are assessed) disguised as personal transfers (e.g., where transaction fees are waived).

Based on the selected past transactions data, the method 200 may identify a large number of available features 204. The available features 204 may include hundreds or even thousands of features. Using a large number of features to construct machine learning rules may not be desirable in some situations, because it may result in the generation of an even larger number of rules; applying a large number of rules to determine the nature of a transaction can be time- and resource-consuming and thus may not be able to classify a transaction on a real time basis (e.g., 5 seconds with the initiation of the transaction).

To reduce the number of machine learning rules to be generated, therefore, the method 200 may apply one or more machine learning algorithms to select a much smaller number of features 206, e.g., five to eight features or fewer than twelve features, from thousands of available features.

The machine learning algorithms that may be applied to produce the selected features 206 may include a Markov blanket algorithm, a CorrSF algorithm, a Fast Correlation Based Filter (FCBF) algorithm, and a RELIEFF algorithm. To identify the selected features 206 from the available features 204, several machine learning algorithms may be applied and several iterations of a same algorithm may be applied.

As shown in FIG. 2, three features (e.g., "one of the items purchased includes a smartphone," "the average transaction amount is $100," and "the total number of user activity in the past six months is no greater than five") are selected.

The method 200 may further include constructing the decision tree 208 based on the selected features 206. The process for constructing a decision tree based on a subset of "best" features are sometimes referred to as a tree learning process; the decision tree so constructed may sometimes be referred to as a learned tree. More detailed of the decision tree 208 is explained with reference to FIG. 2B.

After constructing a decision tree, the method 200 may apply a test data set to the decision tree to evaluate the accuracy of the tree nodes. For example, the computing system 106 may apply a test data set including a predefined number transactions (e.g., 100 transactions, such as, a fraudulent purchase transaction involving a tablet and a smartphone using a credit card from a payment account that has not been used at all in the past ten months; and a legitimate purchase transaction involving a smartphone using a credit line applied for mid-transaction with accurate user identity information) to the decision tree 208 to evaluate the nodes (or one or more features represented thereby) of the decision tree 208.

After evaluating the accuracy of each tree node, the method 200 may select a set of nodes that are associated with a predefined level of accuracy (e.g., 90%, 95%, and 98%) and generate rules in accordance therewith. One or more transaction categorization (or classification) rules may be generated using a same or different set of nodes meeting a predefined accuracy requirement.

For example, if the node A ("less than five user activities in the last six months"), the node B ("the transaction average amount is no greater than $100 per transaction"), and the node C ("the current transaction includes buying a smartphone") all have an accuracy level that is more than 95%, then the method 200 may select these nodes and generate a transaction categorization rule based on features represented by the selected nodes, e.g., the rule that if there are "less than 5 user activities in the last six months," "the average transaction amount is no greater than $100 per transaction," and "the current transaction includes buying a smartphone," then the current transaction is highly likely to be a fraudulent transaction.

Figure 2B:
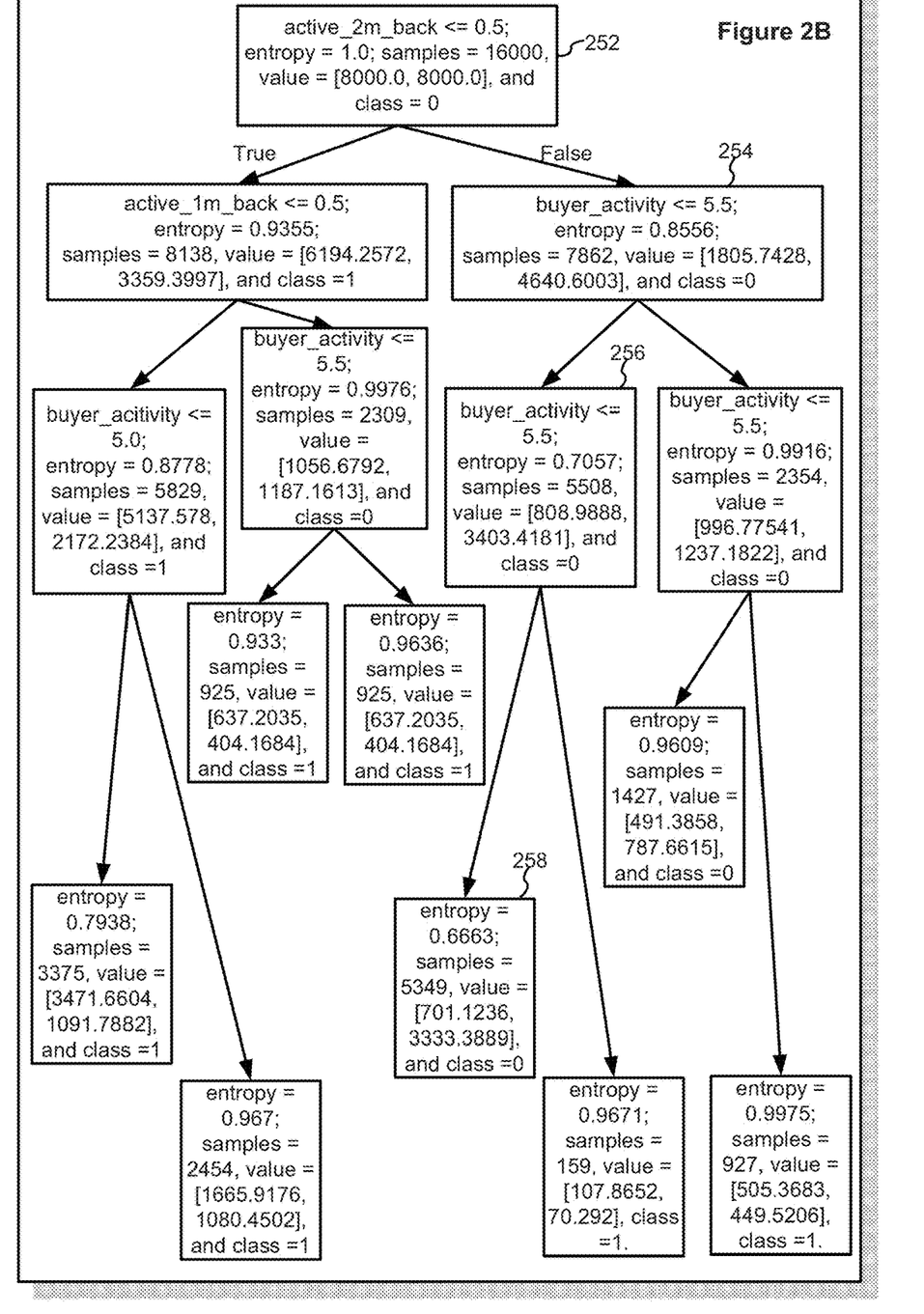
FIG. 2B is a schematic view illustrating an embodiment of a decision tree constructed using a selected set of features.

FIG. 2B is a schematic view illustrating an embodiment of a decision tree constructed using a set of "best" features.

As shown in FIG. 2B, each node may be associated with one or more feature properties. For example, the node 252 represents the following features: active_2m_back<=0.5; entropy=1.0; samples=16000, value=[8000.0, 8000.0], and class=0. The node 254 represents the following features: buyer_activity<=5.5; entropy=0.8556; samples=7882, value=[1805.7428, 4640.0003], and class=0. The node 256 represents the following features s: buyer_activity<=5.5; entropy=0.7057; samples=5508, value=[808.0888, 3403.4181], and class=0. The node 258 represents the following features: entropy=0.6643; samples=5340, value=[107.8652, 70.0292], and class=1.

As shown in FIG. 2B, after applying a test data set to the decision tree 208, the nodes 254, 256, and 258 are determined as having an accuracy level greater than a predefined accuracy level. The method 200 may therefore select these nodes to generate the rule 208.

Figure 3:
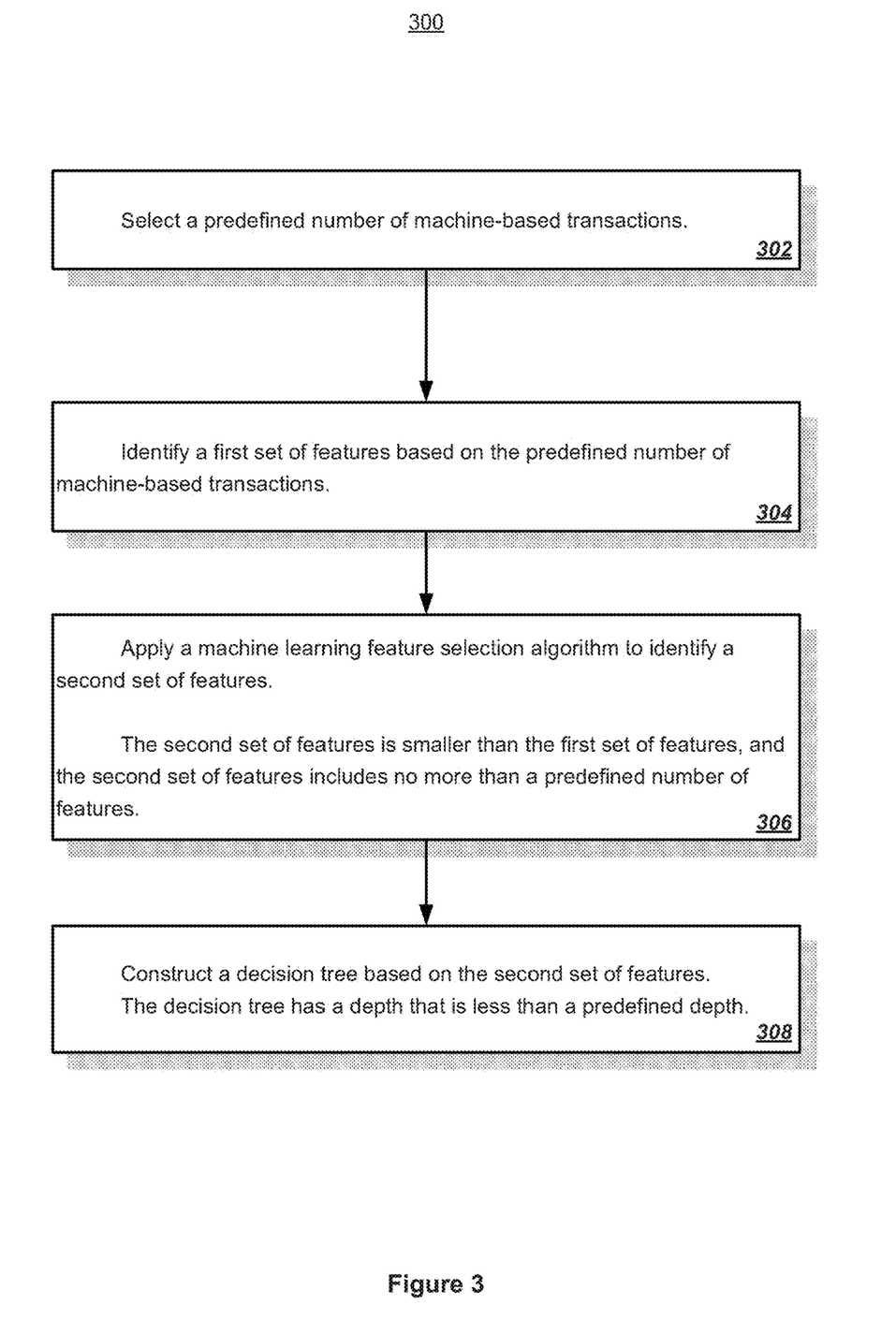
FIG. 3 is a flow chart illustrating an embodiment of a method for selecting machine learning features and constructing rules based on the selected features.

FIG. 3 is a flow chart illustrating an embodiment of a method 300 for selecting machine learning features and constructing rules based on the selected features. The computing device 106, for example, when programmed in accordance with the technologies described in the present disclosure, can perform the method 300.

In some implementations, the method 300 includes a transaction sampling and initial feature identification step. The method 300 may include selecting (302) a predefined number of machine-based transactions from a transaction database.

For example, as explained with reference to FIGS. 1 and 2A, the computing system 106 may randomly select data relating to a predefined number of past transactions, for example, 2,000 past transactions that are known to involve the use of a stolen credit card.

Each machine-based transaction (or each request for conduct a machine-based transaction, in the event that the transaction does not complete) is represented by a vector (e.g., array) of delimited values, which are also referred to as features. A transaction vector may include information descriptive of a transaction, for example, a transaction amount, the type of currency used in the transaction (e.g., US dollar or Chinese RMB), and one or more items purchased in the transactions.

The past transactions may include transactions conducted between a user device (e.g., a smartphone and a tablet computer) and a merchant device (e.g., an order processing server and a POS machine). As a result, a transaction vector may also include information descriptive of one or more devices involved in a transaction, for example, the IP address of a user or merchant device used in the transaction, the information relating to a software application used to conduct the transaction (e.g., the type of the browser used, a browsing session identifier, and whether the session is encrypted).

In some implementations, the method 300 includes, identifying (304) a first set of features based on the predefined number of machine-based transactions. For example, the computing system 106 may identify a group of features, e.g., the transaction amount, a payment method involved, recent account activity level, and the transaction location, based on the past transaction data. The first set of features is also referred to as the base features.

In some implementations, the method 300 includes a feature selection/refinement process. The method 300, for example, may include: limiting features in the second set of features to a predefined total number of features.

Because the total number of base features may be quite large, the method 300 may include selecting a much smaller set of refined features that are more representative of fraudulent transaction with a lower feature redundancy.

The method 300, for example, may include applying (306) a machine learning feature selection algorithm to identify the second set of features. To ensure that the second set of features includes a smaller number of features than those included in the initial set of features and no more than a predefined number of features, several different machine learning algorithms or several iterations of a same machine learning algorithm may be used to identify the second set of features.

This feature refinement process is technically advantageous for at least the following reasons. First, constructing transaction classification rules using a large number of features can result in the rules being too complex to produce results on a real time basis. Second, features selected using this process can interact with (e.g., complement) each other to produce a higher level of correlation to a particular transaction tag (e.g., fraudulent or benign) than any feature individually could, improving the machine learning accuracy.

In some implementations, the method 300 includes a decision tree construction process. The method 300, for example, may include constructing (308) a decision tree based on the second set of features. The decision tree may have a depth that is less than a predefined depth. For example, as explained with reference to FIG. 2B, a decision tree with nodes corresponding to features included in the second set may be constructed (or learned). In some implementations, the decision tree is a binary tree.

Once constructed, a decision tree and nodes included therein may be evaluated for accuracy. This evaluation process may include applying a test data set to the decision tree and determine the accuracy of each node based on the test results. Nodes having a predefined level of accuracy or a predefined number of nodes may be selected for rule generation purpose. For example, in some implementations, the method 300 includes generating a plurality of transaction categorization rules based on the decision tree.

In some implementations, the node selection process is optimized before transaction categorization rules are generated. For example, as explained above, in some implementations, the total number of rules needs to be kept below a predefined number (e.g., fewer than 4) so that the response time (e.g., the total time needed for determining whether a transaction is fraudulent or benign) can be kept short.

For these reasons, a node optimization algorithm may be implemented to select the smallest amount of nodes in a decision tree that can produce the maximum amount of the weighted sum of the f1 score. An example node optimization process involves solving the following equation:

$$\max \sum_i f1_i N_i \text{ s.t. } \sum_i N_i \le C \text{ and } N_i \in \{0, 1\} \tag{1}$$

Here, C represents total number of rules desired; $N_i$ represents an indicator variable for occurrence of node i. The equation (1) may be characterized as a 0-1 knapsack problem with weights of 1 and may be solved by using dynamic programming techniques.

For example, consider the decision tree shown in FIG. 2B. If the total number of rules to be derived is one, the number of nodes that needs to be selected would be three based on equation (1). An example rule may be as follows:
Classify a transaction as a fraudulent transaction if:
active_2m_back<=0.5;
active_1m_back<=0.5; and
buyer_activity<=5.

In some implementations, the method 300 includes selecting a pending transaction and categorizing the pending transaction based on the plurality of transaction categorization rules. For example, transaction categorization rules generated using a decision tree can be used to classify a pending transaction, on a substantially real time basis, as a fraudulent transaction or a benign transaction.

In some implementations, each rule in the plurality of rules is associated with an accuracy score; the method 300 further includes determining a total number of transaction categorization rules; selecting one or more end nodes in the plurality of nodes based on the total number of transaction categorization rules; and generating the total number of transaction categorization rules based on traversing from a root node of the decision tree to each end node in the one or more end nodes.

In some implementations, the method 300 includes: selecting one or more end nodes in the plurality of nodes based on the a transaction maturation time; and generating the total number of transaction categorization rules based on traversing from a root node of the decision to each end node in the one or more end nodes.

In some implementations, the decision tree includes a plurality of nodes, and each node in the plurality node is associated one or more conditions and an accuracy score. For example, as shown in FIG. 2B, each of the nodes 252, 254, 256, and 258 includes several conditions and is assigned an accuracy level after a training data set is applied to the decision tree 208.

In some implementations, the method 300 further includes selecting a pending transaction and categorizing the pending transaction based on the decision tree. In some implementations, categorizing the pending transaction based on the decision tree comprises traversing a tree path from a root node of the decision tree to an end node of the decision tree based on whether the pending transaction meets a condition associated with a node included in the tree path.

In some implementations, the method 300 further includes generating one or more transaction categorization rules based on the tree path.

In some implementations, the method 300 further includes identifying a predefined number of features; selecting the machine feature selection algorithm based on predefined number of features; and applying the machine feature selection algorithm to the first set of features so that the predefined number of features included in the second set of features is no greater than the predefined number of features.

In some implementations, the second set of features includes a first feature and a second feature. The association of both the first feature and the second feature provides a higher level of transaction categorization accuracy than does the first feature or the second feature alone.

In some implementations, the second set of features includes one of a total transaction amount of a first party included in a machine-based transaction, a recent activity level of the first party, a transaction amount of the machine-based transaction, and a transaction location of the machine-based transaction.

In some implementations, the method 300 further includes generating a first number of transaction categorization rules based on the decision tree; selecting a subset of the first number of transaction categorization rules; and presenting the subset of transaction categorization rules to a user.

Figure 4:
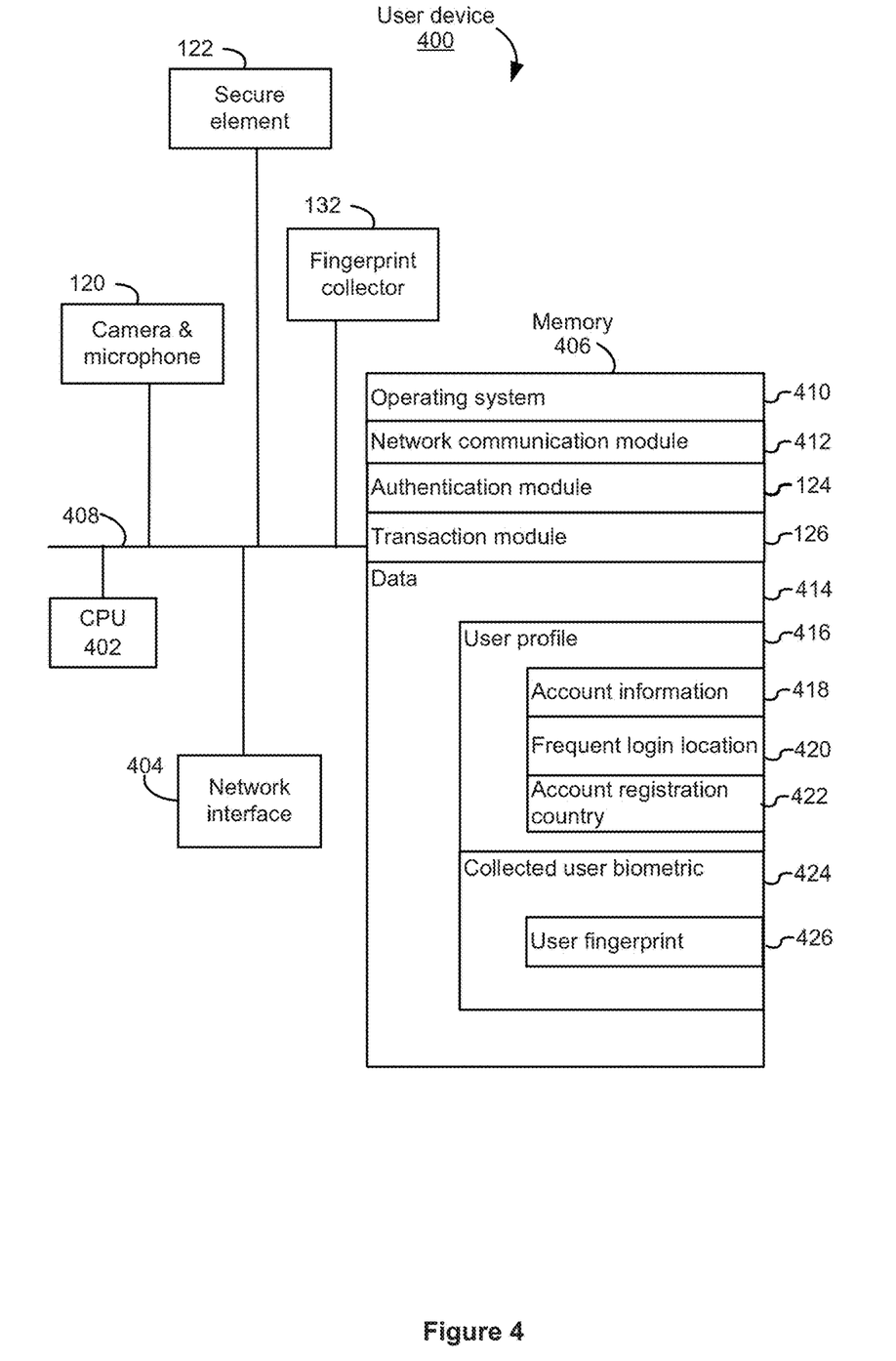
FIG. 4 is a schematic view illustrating an embodiment of a user device.

FIG. 4 is a schematic view illustrating an embodiment of a user device 400, which can be the device 102 shown in FIG. 1. The device 400 in some implementations includes one or more processing units CPU(s) 402 (also referred to as hardware processors), one or more network interfaces 404, a memory 406, and one or more communication buses 406 for interconnecting these components. The communication buses 406 optionally include circuitry (sometimes called a chip set) that interconnects and controls communications between system components. The memory 406 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 406 optionally includes one or more storage devices remotely located from the CPU(s) 402. The memory 406, or alternatively the non-volatile memory device(s) within the memory 406, comprises a non-transitory computer readable storage medium. In some implementations, the memory 406 or alternatively the non-transitory computer readable storage medium stores the following programs, modules and data structures, or a subset thereof:
  an operating system 410, which includes procedures for handling various basic system services and for performing hardware dependent tasks;
  a network communication module (or instructions) 412 for connecting the device 400 with other devices (e.g. the transaction device 108 or the computing system 106) via one or more network interfaces 404 (wired or wireless) or via the communication network 104 (FIG. 1);

an authentication module 124 for authenticating a user on the user device 400 as well as in one or more software application (or apps) installed on the user device 400;

a transaction module 126 for effectuating a transaction (e.g., making or receiving a payment) involving the user device 400, the transaction device 108, the computing system 106, or a combination thereof; and data 414 stored on the device 400, which may include:

a user profile 416 for including information associated with a user, which may include:

user account information 418, e.g., account number, a user name and corresponding password, and a personal identification number (PIN);

a frequent login location 420 for identifying a location at which the user identified in the user profile 416 frequently logs in, e.g., Foster City, the State of California, USA; and China; and an account registration location 422 for identifying a location at which the account identified by the user account information 418 was initially registered or enrolled, e.g., Foster City, the State of California, USA; and China; and user biometric 424, which may include a user fingerprint 426.

The device 400 may also include a secure element 122 for storing information identifying one or more payment methods (e.g., account numbers and payment tokens), one or more identification tokens, and user biometric data known to belong to an authorized user, a camera and microphone 120 for capturing image and voice data of a user, e.g., a facial feature, a pronunciation, a tattoo, and other distinguishing bodily features of the user, and a fingerprint collector 132.

In some implementations, one or more of the above identified elements are stored in one or more of the previously mentioned memory devices, and correspond to a set of instructions for performing functions described above. The above identified modules or programs (e.g., sets of instructions) need not be implemented as separate software programs, procedures or modules, and thus various subsets of these modules may be combined or otherwise re-arranged in various implementations. In some implementations, the memory 406 optionally stores a subset of the modules and data structures identified above. Furthermore, the memory 406 may store additional modules and data structures not described above.

Figure 5:
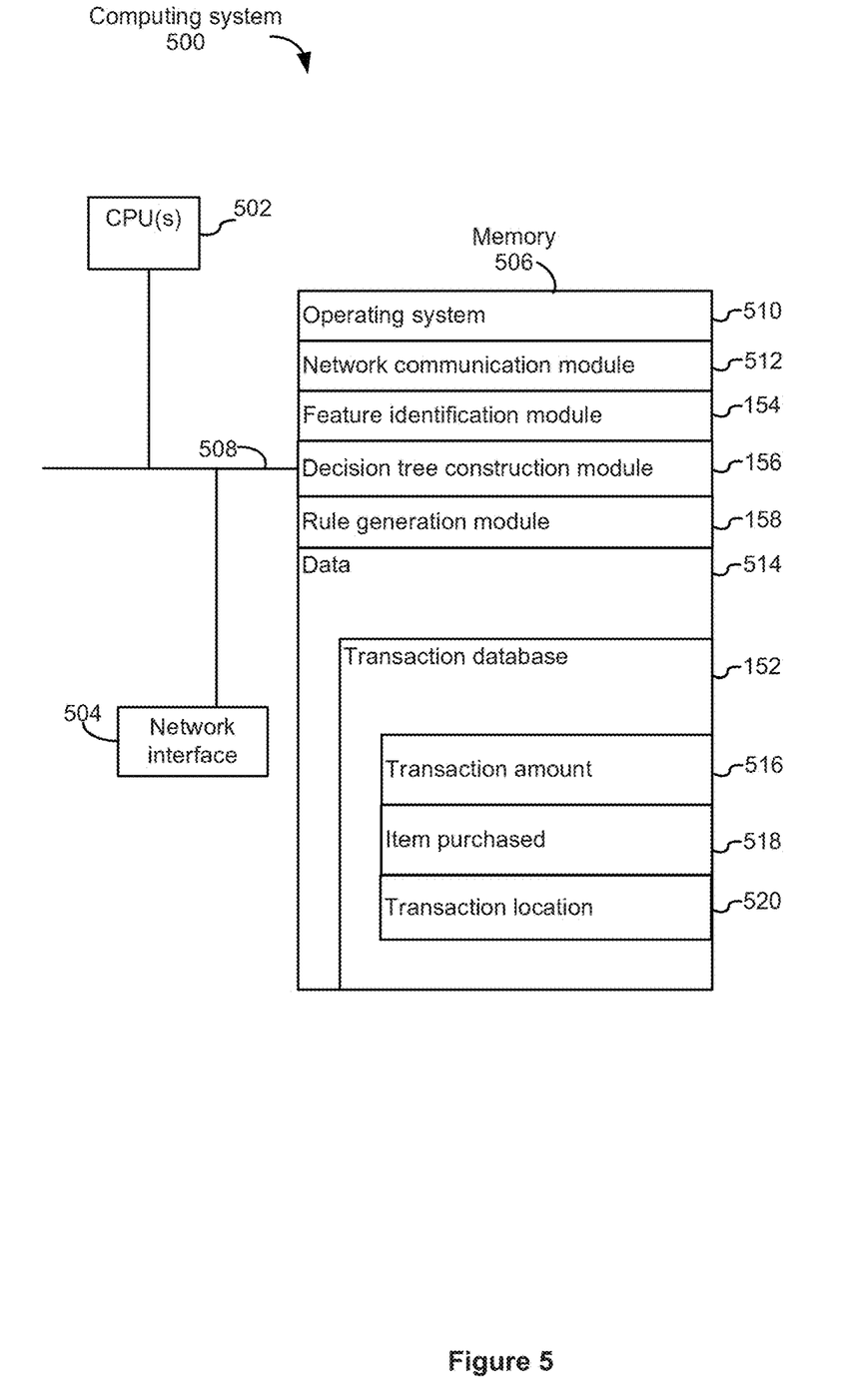
FIG. 5 is a schematic view illustrating an embodiment of a computing system.

FIG. 5 is a schematic view illustrating an embodiment of a computing system 500, which can be the computing system 106 shown in FIG. 1. The system 500 in some implementations includes one or more processing units CPU(s) 502 (also referred to as hardware processors), one or more network interfaces 504, a memory 506, and one or more communication buses 508 for interconnecting these components. The communication buses 508 optionally include circuitry (sometimes called a chipset) that interconnects and controls communications between system components. The memory 506 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 506 optionally includes one or more storage devices remotely located from the CPU(s) 502. The memory 506, or alternatively the non-volatile memory device(s) within the memory 506, comprises a non-transitory computer readable storage medium. In some implementations, the memory 506 or alternatively the non-transitory computer readable storage medium stores the following programs, modules and data structures, or a subset thereof:

an operating system 510, which includes procedures for handling various basic system services and for performing hardware dependent tasks;

a network communication module (or instructions) 512 for connecting the system 500 with other devices (e.g., the user device 102 or the transaction device 108) via one or more network interfaces 504;

a feature identification module 154 for identifying an initial set of features based on past transaction data and for selecting, based on one or more machine learning algorithms, a subset of these features;

a decision tree construction module 156 for constructing a decision tree (e.g., a binary tree) based on a subset of features selected by the feature identification module 154 and for determining the accuracy level of each node on a decision tree based on a training data set;

a rule generation module 158 for generating one or more transaction categorization rules based on nodes that are determined by the decision tree construction module 156 as having an accuracy level that is equal to or above a predefined accuracy level (e.g., 95%); and data 514 stored on the system 500, which may include:

a transaction database 156 for storing information identifying one or more transactions, which may include:

a transaction amount 516, e.g., less than $500;

one or more items (e.g., goods or services) purchased 518, e.g., a smartphone, a tablet computer, and an air ticket; and a transaction location 520 for identifying one or more locations associated with a transaction, e.g., the location of a user device involved in the transaction, and the location of a transaction device involved in the transaction.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 506 optionally stores a subset of the modules and data structures identified above. Furthermore, the memory 506 may store additional modules and data structures not described above.

Although FIGS. 4 and 5 show a "user device 400" and a "computing system 500" and respectively, FIGS. 4 and 5 are intended more as functional description of the various features which may be present in computer systems than as a structural schematic of the implementations described herein. In practice, and as recognized by those of ordinary skill in the art, items shown separately could be combined and some items could be separated.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and users; however, a user or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
   determining a limit on a total number of human-readable transaction categorization rules to be generated;
   selecting a predefined number of machine-based transactions;
   determining a first set of features based on the predefined number of machine-based transactions;
   applying one or more machine learning feature selection algorithms to the first set of features to determine a second set of features, wherein the second set of features is smaller in number than the first set of features, the second set of features includes no more than a predefined number of features, and the predefined number of features is smaller in number than the first set of features;
   constructing a decision tree based on the second set of features, wherein the decision tree has a depth that is less than a predefined depth, and the decision tree includes a plurality of nodes corresponding to the second set of features;
   applying a test data set to the decision tree to determine an accuracy level for each node included in the decision tree, wherein the accuracy level for each node indicates whether that node correctly identifies data in the test data set being associated with a fraudulent or a non-fraudulent machine-based transaction;
   selecting, from the plurality of nodes, a subset of nodes with each node in the subset of nodes having the accuracy level greater than a predefined accuracy level;
   determining a third set of features associated with the subset of nodes; and
   generating a set of the human-readable transaction categorization rules based on the third set of features, wherein the total number of the human-readable transaction categorization rules included in the set is fewer than the limit.

2. The method of claim 1, further comprising:
   selecting a pending transaction; and
   categorizing the pending transaction based on the set of the human-readable transaction categorization rules.

3. The method of claim 1, wherein applying the one or more machine learning feature selection algorithms comprises:
   applying a plurality of iterations of a machine learning feature selection algorithm.

4. The method of claim 1, wherein determining the second set of features comprises:
   determining a first feature and a second feature;
   determining that an association of both the first feature and the second feature provides a higher level of transaction accuracy than does the first feature or the second feature alone; and
   including the first feature and the second feature in the second set of features.

5. The method of claim 1, further comprising:
   determining a transaction maturation time; and
   selecting the limit based on the transaction maturation time.

6. The method of claim 1, wherein the second set of features includes one of a total transaction amount of a first party included in a machine-based transaction, a recent activity level of the first party, a transaction amount of the machine-based transaction, or a transaction location of the machine-based transaction.

7. The method of claim 1, wherein applying the one or more machine learning feature selection algorithms further comprises applying a first algorithm to the first set of features and applying a second algorithm, different from the first algorithm, to the first set of features.

8. The method of claim 1, wherein the machine-based transactions include matured transactions that have completed and been classified as a benign transaction or a fraudulent transaction.

9. The method of claim 1, wherein the machine-based transactions include transactions conducted between one or more user devices and one or more merchant devices.

10. The method of claim 1, wherein the predefined number of features is lower by at least a factor of ten than the first set of features.

11. A non-transitory machine-readable medium having stored thereon machine-readable instructions executable to cause a machine to perform operations comprising:
    selecting a predefined number of machine-based transactions;
    determining a first set of features based on the predefined number of machine-based transactions;
    applying one or more machine learning feature selection algorithms to the first set of features to determine a second set of features, wherein the second set of features is smaller in number than the first set of features, and the second set of features includes no more than a predefined number of features, the predefined number of features is smaller in number than the first set of features;
    constructing a decision tree based on the second set of features, wherein the decision tree has a depth that is less than a predefined depth, and the decision tree includes a plurality of nodes corresponding to the second set of features;

applying a test data set to the decision tree to determine an accuracy level for each node included in the decision tree, wherein the accuracy level for each node indicates whether that node correctly identifies data in the test data set being associated with a fraudulent or a non-fraudulent machine-based transaction;

selecting, from the plurality of nodes, a subset of nodes with each node in the subset of nodes having the accuracy level greater than a predefined accuracy level;

determining a third set of features associated with the subset of nodes; and generating a set of the human-readable transaction categorization rules based on the third set of features, wherein a total number of the human-readable transaction categorization rules included in the set is fewer than a limit on a total number of human readable transaction categorization rules to be generated.

12. The non-transitory machine-readable medium of claim 11, wherein determining the second set of features comprises:

determining a first feature and a second feature;

determining that an association of both the first feature and the second feature provides a higher level of transaction accuracy than does the first feature or the second feature alone; and including the first feature and the second feature in the second set of features.

13. The non-transitory machine-readable medium of claim 11, wherein the machine-based transactions include matured transactions that have been classified as a benign transaction or a fraudulent transaction.

14. The non-transitory machine-readable medium of claim 11, wherein generating the set of the human-readable transaction categorization rules based on the third set of features includes: generating a description corresponding to a human-readable transaction categorization rule based on a property and a value associated with a feature.

15. The non-transitory machine-readable medium of claim 11, wherein applying the one or more machine learning feature selection algorithms comprises:

applying a plurality of iterations of a machine learning feature selection algorithm.

16. The non-transitory machine-readable medium of claim 11, wherein the operations further comprise:

determining a transaction maturation time; and selecting the limit based on the transaction maturation time.

17. A system, comprising:

a non-transitory memory; and one or more hardware processors coupled to the non-transitory memory and configured to execute instructions to perform operations comprising:

selecting a predefined number of machine-based transactions;

determining a first set of features based on the predefined number of machine-based transactions;

determining, using one or more machine learning feature selection algorithms, a second set of features from the first set of features, wherein the second set of features is smaller in number than the first set of features, the second set of features includes no more than a predefined number of features, and the predefined number of features is smaller than a number of the first set of features;

constructing a decision tree based on the second set of features, wherein the decision tree has a depth that is less than a predefined depth and the decision tree includes a plurality of nodes corresponding to the second set of features;

applying a test data set to the decision tree to determine an accuracy level for each node included in the decision tree;

selecting, from the plurality of nodes, a subset of nodes with each node in the subset of nodes having the accuracy level greater than a predefined accuracy level, wherein the accuracy level for each node in the subset of nodes indicates whether that node correctly identifies data in the test data set being associated with a fraudulent or a non-fraudulent machine-based transaction;

determining a third set of features associated with the subset of nodes; and generating a set of the human-readable transaction categorization rules based on the third set of features, wherein a total number of the human-readable transaction categorization rules included in the set is fewer than a limit on a total number of human readable transaction categorization rules to be generated.

18. The system of claim 17, wherein determining the second set of features comprises:

determining a first feature and a second feature;

determining that association of both the first feature and the second feature provides a higher level of transaction accuracy than does the first feature or the second feature alone; and including the first feature and the second feature in the second set of features.

19. The system of claim 17, wherein the machine-based transactions include matured transactions that have been classified as a benign transaction or a fraudulent transaction.

20. The system of claim 17, wherein generating the set of the human-readable transaction categorization rules based on the third set of features includes:

generating a description corresponding to a human-readable transaction categorization rule based on a property and a value associated with a feature.

* * * * *

UNITED STATES PATENT AND TRADEMARK OFFICE
CERTIFICATE OF CORRECTION

| | |
|---|---|
| PATENT NO. | : 11,443,224 B2 |
| APPLICATION NO. | : 15/249790 |
| DATED | : September 13, 2022 |
| INVENTOR(S) | : Avishay Meron et al. |

It is certified that error appears in the above-identified patent and that said Letters Patent is hereby corrected as shown below:

On the Title Page

Under item (*) Notice remove "This patent is subject to a terminal disclaimer."

Signed and Sealed this
Fifteenth Day of November, 2022

Katherine Kelly Vidal
*Director of the United States Patent and Trademark Office*